(No Model.) 2 Sheets—Sheet 2.
A. H. CLARK.
BICYCLE.
No. 486,432. Patented Nov. 22, 1892.
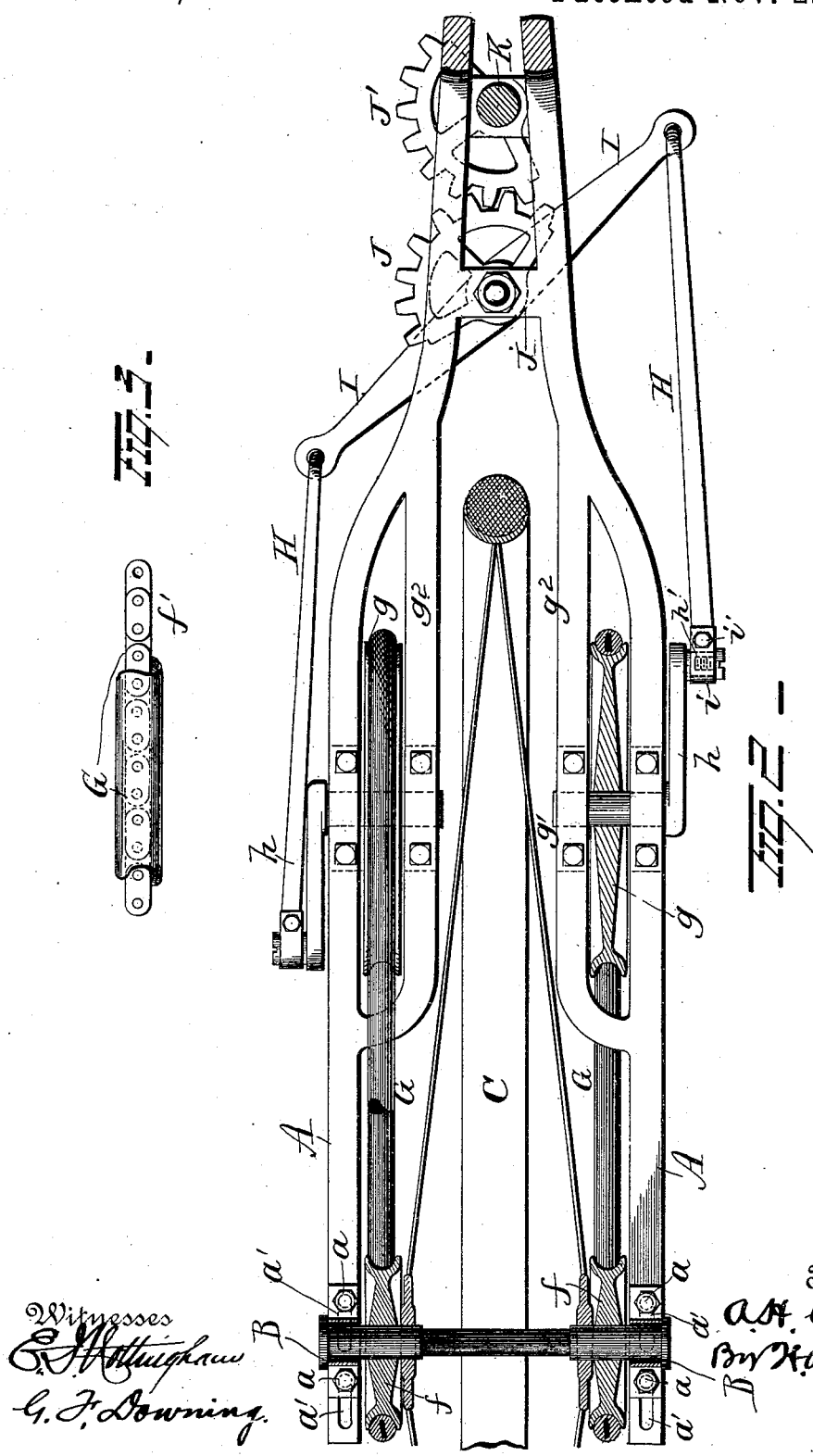

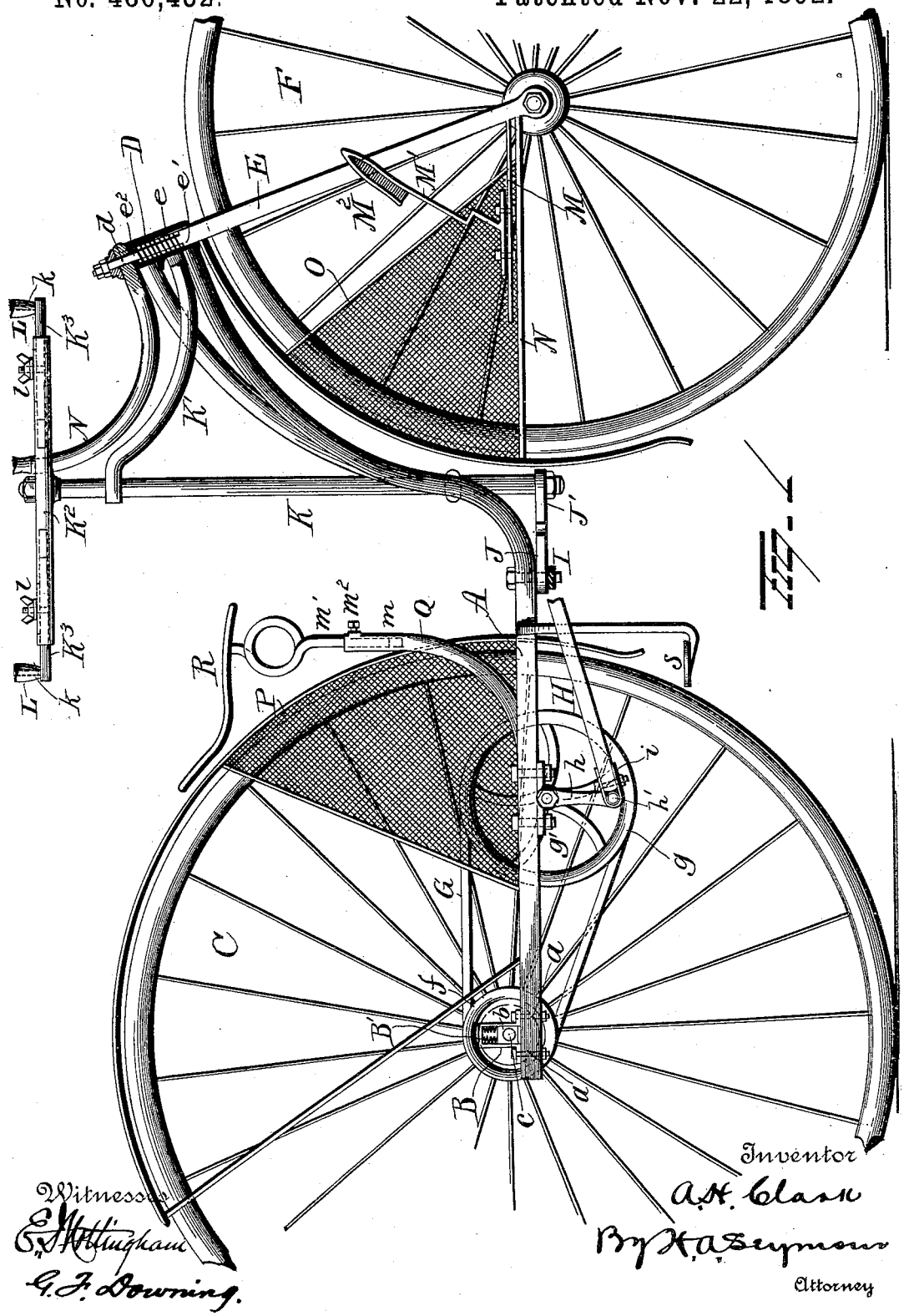

UNITED STATES PATENT OFFICE.

ALEXANDER H. CLARK, OF FOND DU LAC, WISCONSIN.

BICYCLE.

SPECIFICATION forming part of Letters Patent No. 486,432, dated November 22, 1892.

Application filed January 16, 1892. Serial No. 418,297. (No model.)

*To all whom it may concern:*

Be it known that I, ALEXANDER H. CLARK, a resident of Fond du Lac, in the county of Fond du Lac and State of Wisconsin, have invented certain new and useful Improvements in Bicycles; and I do hereby declare the following to be a full, clear, and exact description of the invention, such as will enable others skilled in the art to which it appertains to make and use the same.

My invention relates to an improvement in bicycles, the object of the invention being to construct a bicycle which may be easily and effectually guided by means of the feet of the rider.

A further object is to provide extensible handles for a bicycle, by means of which to propel the same.

A further object is to provide improved propelling apparatus for a bicycle.

A further object is to provide gearing for a bicycle which shall be effectual in operation and at the same time be practically noiseless.

A further object is to provide improved yielding devices for various parts of a bicycle.

With these objects in view the invention consists in certain novel features of construction and combinations and arrangements of parts, as hereinafter set forth, and pointed out in the claims.

In the accompanying drawings, Figure 1 is an elevation of my improved bicycle. Fig. 2 is a plan view illustrating the driving mechanism. Fig. 3 is a detail view.

A A represent the spines or backbones (two in number) of a bicycle, at the rear ends of which two boxes B are mounted and secured by means of bolts $a$, said bolts passing through elongated slots $a'$ in the spines or backbones, so that said boxes may be adjusted for a purpose which will presently appear. Located in each box B is a journal-box $b$, in which the ends of the axle $c$ of the rear wheel C of the bicycle are mounted. Springs B' are located in the boxes B and adapted to bear on the journal-boxes $b$ at one end and at their other ends against the tops of the boxes B, thereby imparting a yielding action to the rear end of the machine.

The forward ends of the spines or backbones A A are curved upwardly and forwardly and secured at their forward ends to the ends of a sleeve D, through which the shank $d$ of the front fork E passes loosely, the axle of the front wheel F being mounted in the lower ends of said fork. A portion of the shank $d$ is contracted somewhat and produces a space between it and the interior wall of the sleeve D, in which space a spring $e$ is located, one end of said spring bearing on a shoulder $e'$ of the shank $d$ and at the upper end against a shoulder $e^2$ at the top of the sleeve D, thereby imparting a yielding action to the forward wheel F of the machine.

Secured to the axle of the rear wheel C, in proximity to the spines or backbones A A, are two drive-wheels or pulleys $f\ f$, which are grooved for the reception of drive-chains G, said drive-chains being inclosed within envelopes $f'$, of rubber or other yielding material, to increase the frictional contact of said drive-chains with the wheels or pulleys, over which they pass.

Located at points forwardly from the rear ends of the spines A are grooved wheels or pulleys $g\ g$, the axles of said pulleys being mounted in brackets $g'$, depending from the spines and bars $g^2$, secured to said spines, the said drive-chains G also passing over these wheels or pulleys $g\ g$. The axles of the wheels or pulleys $g\ g$ are extended somewhat beyond their bearings and have crank-arms $h\ h$ secured thereto, to the crank-pins $h'$ of which pitmen H are connected. In making the connection between the pitmen H and the crank-pins $h'$, straps $i$ are passed about the crank-pins and connected at their ends to the ends of vertical bolts or pins $i'$, passing through the rear ends of the pitmen H. From this construction it will be seen that the pitmen are adapted to have a reciprocating motion as the crank-arms $h$ rotate and are also adapted to have a lateral motion. A lever I is pivoted at its center to a cross-bar $j$, secured between the spines A A at or near the forward ends of the straight portions of said spines. The ends of the lever I are pivotally connected to the forward ends of the pitmen H. Carried by the lever I is a segment-rack J, which is adapted to mesh with a similar segment-rack J', carried at the lower end of a vertical rod or standard K, said standard being supported near its lower end by the spines A and at its upper portion by braces K', which latter are secured to the sleeve D. The rod or standard K is adapted to have a limited rotary motion in both directions and provided at its upper end with a cross-bar $K^2$, to the ends of which adjustable handles L are connected, said handles being revolubly mounted on pins $k$, projecting upwardly from the ends of bars $K^3$, said bars being adjustably secured to the cross-bar $K^2$ by means of thumb-screws $l$.

By making the handles L adjustable the amount of leverage may be easily regulated when it is desired to increase or decrease the speed of the machine.

The machine is propelled by vibrating the handles back and forth, oscillatory motion being thus imparted from the rod or standard K to the segment-rack J', from which motion is transmitted to the segment-rack J, thus vibrating the lever I, from which motion is imparted through the pitmen H and crank-arms $h$ $h$ to the wheels or pulleys $g$ $g$, and thence through the chains G to the wheels or pulleys $f$, whereby motion will be imparted to the rear wheel C of the machine.

Bars M are secured and project rearwardly from the fork E and have secured thereto foot-rests M', which project upwardly from said bars M, the upper portions of said foot-rests being provided with a covering $M^2$ for the foot of the rider. By means of the foot-rests M' the rider may easily and effectually guide the machine with his feet. A handle N is also secured to the upper end of the shank $d$ of the fork E, whereby the machine may be guided by hand, if desired. A guard O for the front wheel is supported by means of rods N', secured to the fork E, the upper end of said guard being also secured to said fork at or near its upper end. A guard P for the rear wheel is supported on the spines A. Secured to the spines A in proximity to the wheels or pulleys $g$ is a curved seat-standard Q, provided at its upper end with a socket $m$ for the reception of one end of a seat-spring $m'$, which latter is secured in place by a screw $m^2$. A seat R is carried by the upper end of the seat-spring $m'$, said seat being located immediately in front of the rear wheel C of the machine.

A mounting-step S is secured to one of the spines A in proximity to the rear wheel C.

Having fully described my invention, what I claim as new, and desire to secure by Letters Patent, is—

1. In a bicycle, the combination, with two driving-wheels and crank-arms secured to the axles thereof, of pitmen connected to said crank-arms, a pivoted lever connected at its ends to said pitmen, and means for vibrating said lever to transmit a rotary motion to said wheels, substantially as set forth.

2. In a bicycle, the combination, with driving wheels or pulleys and crank-arms on the axles thereof, of pitmen connected with said crank-arms and adapted to reciprocate with the rotation of said crank-arms, and also a lateral movement independent of said crank-arms, a pivoted lever connected to said pitmen, and means for vibrating said pivoted lever to impart a rotary motion to the drive wheels or pulleys, substantially as set forth.

3. In a bicycle, the combination, with driving wheels or pulleys and crank-arms carried by the axles of said drive wheels or pulleys, of pitmen connected with said crank-arms, a pivoted lever connected at its ends to the forward ends of said pitmen, a segment-rack carried by said pivoted lever, an oscillatory rod or upright, a segment-rack carried by said oscillatory upright or rod and adapted to mesh with the segment-rack carried by the pivoted lever, and means for oscillating said rod or upright, substantially as set forth.

4. In a bicycle, the combination, with the driving pulleys or wheels, of an oscillatory rod or upright, mechanism for transmitting motion from said oscillatory rod or upright to the drive wheels or pulleys, and adjustable handles at the upper end of said oscillatory rod or upright, substantially as set forth.

5. In a bicycle, the combination, with the driving-wheels and crank-arms thereon, of pitmen connected to said crank-arms, a pivoted lever connected at its ends to said pitmen, a vertical shaft connected to said lever and adapted to have a rocking movement, and extensible handles connected to said shaft at the upper end thereof, substantially as set forth.

6. In a velocipede, the combination, with a frame, wheels, and propelling mechanism adapted to be actuated by hand, of foot-rests carried by the front fork of the frame for turning said fork and the wheel carried thereby, the said foot-rests projecting rearwardly from the front fork and located in a plane behind the plane of said fork, substantially as and for the purpose set forth.

7. In a bicycle, the combination, with driving-pulleys, of an oscillatory upright, mechanism for communicating motion from said oscillatory upright to the drive wheels or pulleys, means for oscillating said oscillatory upright, and braces for supporting said oscillatory upright, substantially as set forth.

8. In a bicycle, the combination, with the spines or backbones, of boxes adjustably mounted on the rear ends of said spines or backbones, journal-boxes located within said boxes and adapted to receive the axle of the rear wheel, and springs located within said boxes and adapted to bear on the journal-boxes.

9. In a bicycle, the combination, with drive wheels or pulleys and crank-arms carried by the axle of said drive wheels or pulleys, of pitmen, bolts passing through said pitmen, straps connected at their ends to said bolts and passing about the crank-pins on said crank-arms, so that said pitmen can have a lateral movement, and mechanism for reciprocating said pitmen, substantially as set forth.

In testimony whereof I have signed this specification in the presence of two subscribing witnesses.

ALEXANDER H. CLARK.

Witnesses:
MAURICE MCKENNA,
C. C. HANSON.